(12) United States Patent
Suzuki et al.

(10) Patent No.: US 11,332,230 B2
(45) Date of Patent: May 17, 2022

(54) METHOD FOR PRODUCING ASSEMBLY, REINFORCING MEMBER, AND ASSEMBLY

(71) Applicant: MITSUBISHI HEAVY INDUSTRIES, LTD., Tokyo (JP)

(72) Inventors: Akihito Suzuki, Tokyo (JP); Kenji Murakami, Tokyo (JP); Kana Sakon, Tokyo (JP); Akihisa Okuda, Tokyo (JP); Takayuki Shimizu, Tokyo (JP); Takumi Shinohara, Tokyo (JP); Jun Eto, Tokyo (JP); Yukifumi Toyama, Tokyo (JP); Junichiro Miyagaki, Tokyo (JP); Kenichi Kawakami, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 31 days.

(21) Appl. No.: 16/769,362

(22) PCT Filed: Nov. 26, 2018

(86) PCT No.: PCT/JP2018/043414
§ 371 (c)(1),
(2) Date: Jul. 20, 2020

(87) PCT Pub. No.: WO2019/159478
PCT Pub. Date: Aug. 22, 2019

(65) Prior Publication Data
US 2021/0114712 A1    Apr. 22, 2021

(30) Foreign Application Priority Data

Feb. 13, 2018 (JP) .............................. JP2018-023265

(51) Int. Cl.
*B64C 3/26*    (2006.01)
*B64C 3/18*    (2006.01)
(Continued)

(52) U.S. Cl.
CPC ............... *B64C 3/26* (2013.01); *B64C 3/185* (2013.01); *B29C 70/06* (2013.01);
(Continued)

(58) Field of Classification Search
None
See application file for complete search history.

(56) References Cited

U.S. PATENT DOCUMENTS

2002/0031641 A1    3/2002    George et al.
2012/0074265 A1    3/2012    Hallander et al.
(Continued)

FOREIGN PATENT DOCUMENTS

JP    2016-500586 A    1/2016
JP    2016-028849 A    3/2016
(Continued)

OTHER PUBLICATIONS

PCT/ISA/210, "International Search Report for International Application No. PCT/JP2018/043414," dated Feb. 5, 2019.
(Continued)

*Primary Examiner* — Alexander S Thomas
(74) *Attorney, Agent, or Firm* — Manabu Kanesaka; Benjamin Hauptman; Kenneth Berner

(57) ABSTRACT

The method for producing an assembly is a method for producing an assembly equipped with a member to be reinforced (20), a reinforcing member body (41), and a filler (42), wherein the reinforcing member body (41) has a pair of flanges (44) arranged spaced on the surface (20B) of the member to be reinforced (20), a web (45), and a connection portion (46) which connects the flanges (44) and the web (45) and forms a filler space (V) with the surface (20B). The method for producing an assembly includes a step for inserting a filler (42) into the filler space (V), a step for attaching a crack control member (43) to cover the end of the
(Continued)

filler (42), a step for joining the flanges (44) and the member to be reinforced (20), and a step for curing at least the member to be reinforced (20).

8 Claims, 14 Drawing Sheets

(51) Int. Cl.
  *B64F 5/10* (2017.01)
  *B29C 70/06* (2006.01)
  *B29L 31/30* (2006.01)
  *B64C 1/06* (2006.01)
  *B64C 1/00* (2006.01)

(52) U.S. Cl.
  CPC ............... *B29L 2031/3082* (2013.01); *B29L 2031/3085* (2013.01); *B64C 1/06* (2013.01); *B64C 2001/0081* (2013.01); *B64F 5/10* (2017.01)

(56) References Cited

U.S. PATENT DOCUMENTS

| | | |
|---|---|---|
| 2013/0233973 A1* | 9/2013 | Nordman ............... B64C 3/182 244/131 |
| 2014/0099477 A1 | 4/2014 | Matsen et al. |
| 2015/0367619 A1 | 12/2015 | Butler et al. |
| 2016/0023431 A1 | 1/2016 | Zarfos et al. |

FOREIGN PATENT DOCUMENTS

| | | |
|---|---|---|
| JP | 2016-030440 A | 3/2016 |
| JP | 2016-182924 A | 10/2016 |

OTHER PUBLICATIONS

PCT/ISA/237, "Written Opinion of the International Searching Authority for International Application No. PCT/JP2018/043414," dated Feb. 5, 2019.

\* cited by examiner

METHOD FOR PRODUCING ASSEMBLY, REINFORCING MEMBER, AND ASSEMBLY

TECHNICAL FIELD

The present invention relates to a method for producing an assembly, a reinforcing member, and an assembly.

Priority is claimed on Japanese Patent Application No. 2018-023265, filed on Feb. 13, 2018, the content of which is incorporated herein by reference.

BACKGROUND ART

A wing (a main wing and a horizontal stabilizer) of an aircraft includes a skin panel (skin) that forms a wing surface and various types of reinforcing members that are disposed inside the skin panel and reinforce the skin panel. The wing of an aircraft includes, for example, a spar that extends in a wing width direction and a plurality of stiffeners that extend in the wing width direction and a direction intersecting the spar, as reinforcing members.

Out of the various types of reinforcing members, the stiffeners will be described in detail. The stiffeners are classified into a plurality of types based on a sectional shape. A T-shaped beam stiffener having a T-shaped sectional shape and an I-shaped beam stiffener having an I-shaped sectional shape are mainly used.

The stiffeners each have a stiffener body and a filler. The stiffener body has a flange that extends along an inner surface of the skin panel, a web that extends in a direction intersecting the flange, and a connecting portion that connects the flange and the web to each other, in a cross sectional view from the wing width direction (for example, refer to PTL 1 below). The connecting portion curves from a flange side to a web side. For this reason, a space (filler space) is formed between the inner surface of the skin panel and the connecting portion. The filler space is filled with the filler.

However, in recent years, examples of forming a wing of fiber reinforced plastic have increased. Fiber reinforced plastic (FRP) is lighter and has higher corrosion resistance than aluminum alloys used in the related art. Accordingly, the fuel efficiency and durability of the aircraft can be improved. In obtaining fiber reinforced plastic, a fiber material such as a carbon fiber or a glass fiber is laid up and disposed in one direction or a plurality of directions, and then the fiber material is infiltrated with a matrix containing a thermosetting resin. When the matrix is cooled and cured, a desired member is obtained. In addition, a method for obtaining a desired shape by laying up a prepreg material in a half-cured state is also adopted.

Herein, for example, in a case where the stiffener body and the filler which are described above are formed of fiber reinforced plastic, generally, a fiber direction of the stiffener body and a fiber direction of the filler are different from each other in many cases. Specifically, the stiffener body is formed of a prepreg material having fibers directed in multiple directions, and the filler is formed using a prepreg material having fibers directed in only one direction. In assembling the wing, the stiffener body and the filler are joined and cured, and then an assembly of the stiffener body and the filler is joined to the inner surface of the skin panel to cure the skin panel.

CITATION LIST

Patent Literature

[PTL 1] Japanese Unexamined Patent Application Publication No. 2016-28849

SUMMARY OF INVENTION

Technical Problem

However, in a case where the fiber direction of the stiffener body and the fiber direction of the filler, which are the reinforcing members, are different from each other as in the example, a difference in a linear expansion coefficient between the stiffener body and the filler in a certain direction occurs. That is, a difference in the amount of thermal expansion or the amount of shrinkage between the reinforcing member body and the filler occurs. Accordingly, when the skin panel, which is the member to be reinforced, is cured, internal stress is generated between the skin panel and the filler, and a crack is generated particularly at an end portion of the filler in some cases. In a case where the crack is generated, the yield of a producing process of the wing, which is the assembly, declines since the quality standards are not met.

The present invention is devised in order to solve the problems, and an object thereof is to provide a method for producing an assembly, a reinforcing member, and an assembly that can improve the yield.

Solution to Problem

According to a first aspect of the invention, there is provided a method for producing an assembly including a member to be reinforced that extends at least in one direction, a reinforcing member body that is attached to a surface of the member to be reinforced and extends in the one direction, and a filler that is provided between the reinforcing member body and the surface and extends in the one direction. In a cross sectional view orthogonal to the one direction, the reinforcing member body has a pair of flange portions that extends along the surface and is arranged at an interval on the surface, a web portion that extends in a direction intersecting the surface, and a connecting portion that connects the pair of flange portions to the web portion and forms a filler space allowing the filler to be inserted therein between the surface and the connecting portion. The method for producing an assembly includes a step of inserting the filler into the filler space and joining the reinforcing member body to the filler, a step of attaching a crack regulating member that covers an end portion of the filler in the one direction to at least the end portion, a step of joining the flange portions to the member to be reinforced, and a step of curing at least the member to be reinforced.

According to the aspect, the crack regulating member that covers the end portion is attached to at least the end portion of the filler. Accordingly, at least when the member to be reinforced is cured, a possibility that a crack is generated in the filler can be reduced.

Therefore, the yield of the assembly can be improved.

According to a second aspect of the invention, there is provided a method for producing an assembly including a member to be reinforced that extends at least in one direction, a reinforcing member body that is attached to a surface of the member to be reinforced and extends in the one direction, and a filler that is provided between the reinforcing member body and the surface and extends in the one direction. In a cross sectional view orthogonal to the one direction, the reinforcing member body has a pair of flange portions that extends along the surface and is arranged at an interval on the surface, a web portion that extends in a direction intersecting the surface, and a connecting portion that connects the pair of flange portions to the web portion and forms a filler space allowing the filler to be inserted therein between the surface and the connecting portion. The method for producing an assembly includes a step of inserting the filler into the filler space and joining the reinforcing member body to the filler, a step of joining the flange portions to the surface, a step of attaching a crack regulating member that covers an end portion of the filler in the one direction to at least the end portion, and a step of curing at least the member to be reinforced.

According to the aspect, the crack regulating member that covers the end portion is attached to at least the end portion of the filler. Accordingly, at least when the member to be reinforced is cured, a possibility that a crack is generated in the filler can be reduced.

Therefore, the yield of the assembly can be improved.

According to a third aspect of the method for producing an assembly, the method for producing an assembly according to the first or second aspect further includes a step of removing a portion including at least an end portion of the reinforcing member body in a direction where the assembly extends and the end portion of the filler after the step of attaching the crack regulating member.

According to a fourth aspect of the method for producing an assembly, in the method for producing an assembly according to the first or second aspect, a crack extending in a permissible direction is formed in advance in a portion including at least the end portion of the filler.

According to a fifth aspect of the method for producing an assembly, the method for producing an assembly according to the first or second aspect further includes a step of forming a crack causing portion that generates a crack extending in a permissible direction in a portion including at least the end portion of the filler.

According to a sixth aspect of the method for producing an assembly, in the method for producing an assembly according to the fifth aspect, the crack causing portion is a film that extends along the permissible crack.

According to a seventh aspect of the method for producing an assembly, the method for producing an assembly according to the first or second aspect further includes a step of providing a development prevention portion that is provided at a position separated from the end portion of the filler and prevents development of a crack in the filler.

According to an eighth aspect of the method for producing an assembly, in the method for producing an assembly according to the seventh aspect, the development prevention portion is formed of a resin material, and the filler is formed of a material different from that of the development prevention portion.

According to a ninth aspect of the method for producing an assembly, in the method for producing an assembly according to the seventh aspect, the development prevention portion is formed of a metallic material, and the filler is formed of a material different from that of the development prevention portion.

According to a tenth aspect of the invention, there is provided a reinforcing member including a reinforcing member body that is attached to a surface of a member to be reinforced extending at least in one direction and extends in the one direction and a filler that is provided between the reinforcing member body and the surface and extends in the one direction. In a cross sectional view orthogonal to the one direction, the reinforcing member body has a pair of flange portions that extends along the surface and is arranged at an interval on the surface, a web portion that extends in a direction intersecting the surface, and a connecting portion that connects the pair of flange portions and the web portion to each other and forms a filler space allowing the filler to be inserted therein between the surface and the connecting portion. The reinforcing member further includes a crack regulating member that covers at least an end portion of the filler in the one direction.

According to the aspect, the crack regulating member that covers the end portion is attached to at least the end portion of the filler. Accordingly, at least when the member to be reinforced is cured, a possibility that a crack is generated in the filler can be reduced.

Therefore, the yield of the assembly can be improved.

According to an eleventh aspect of the invention, there is provided an assembly including the member to be reinforced and the reinforcing member according to the tenth aspect that is attached to the surface of the member to be reinforced.

Advantageous Effects of Invention

In the present invention, the yield of the assembly can be improved.

DESCRIPTION OF EMBODIMENTS

First Embodiment

Figure 1:
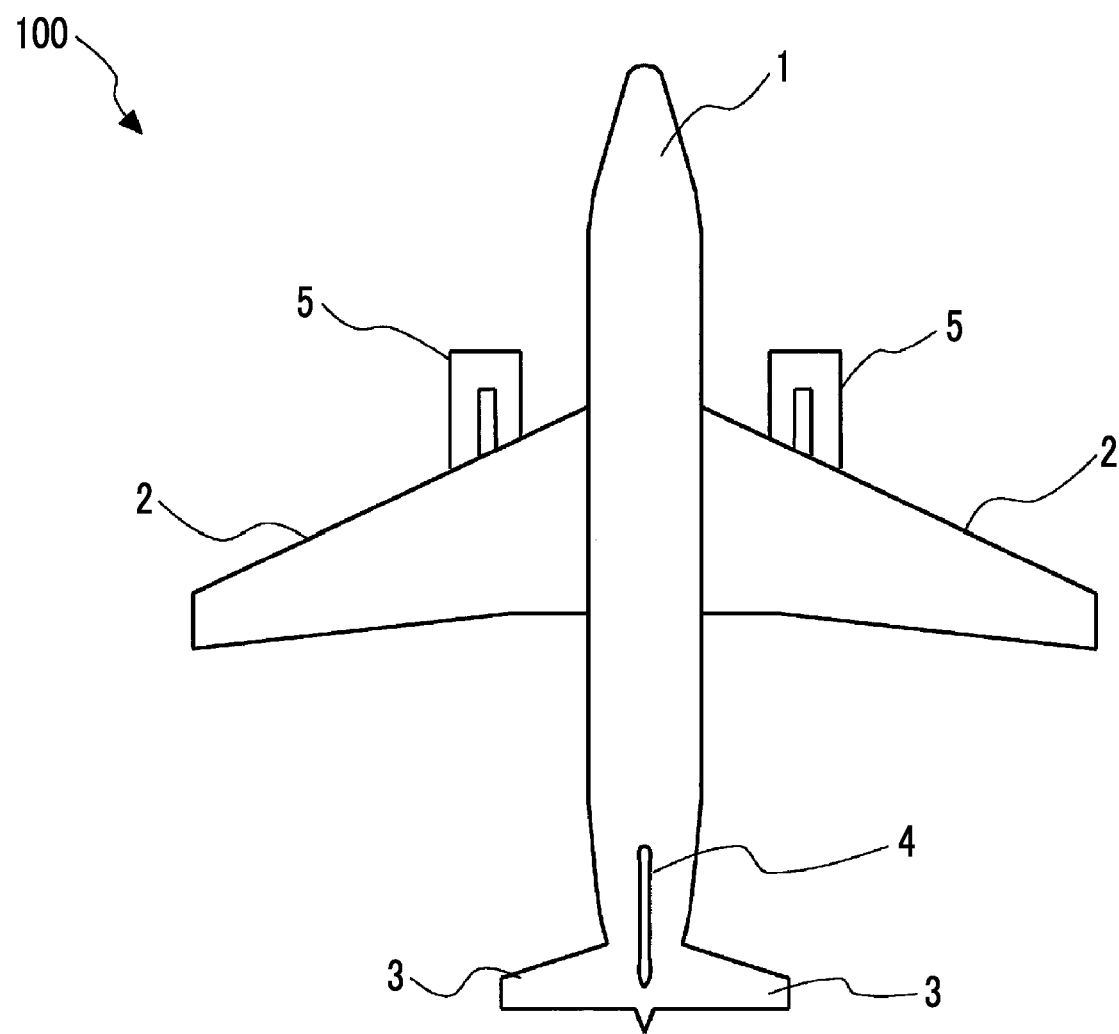
FIG. 1 is a plan view illustrating a configuration of an aircraft according to a first embodiment of the present invention.

A first embodiment of the present invention will be described with reference to FIGS. 1 to 6. As illustrated in FIG. 1, an aircraft 100 according to the embodiment includes a fuselage 1, main wings 2 (assembly), horizontal stabilizers 3, a vertical stabilizer 4, and turbofan engines 5.

The fuselage 1 has a tubular shape extending in a traveling direction of the aircraft 100, and a passenger is on board therein. The main wings 2 generate lift as the aircraft 100 glides and flies. The main wings 2 extend in a substantially horizontal direction from a substantially central portion of the fuselage 1. One main wing 2 is provided on each of the right and left sides of the fuselage 1. The horizontal stabilizers 3 are provided to change the posture (pitch angle) of the aircraft 100 during flight. The horizontal stabilizers 3 extend substantially in the horizontal direction from the vicinity of an end portion at the rear of the fuselage 1. One horizontal stabilizer 3 is provided on each of the right and left sides of the fuselage 1. The vertical stabilizer 4 is provided to change the posture (yaw angle) of the aircraft 100 during flight. The vertical stabilizer 4 extends upward from the vicinity of the end portion at the rear of the fuselage 1. The turbofan engines 5 generate thrust rearward by combusting a mixture of fuel and air. The turbofan engines 5 are suspended one by one from respective lower surfaces of the main wings 2. As a device for generating thrust, it is also possible to use a device other than the turbofan engines 5 (for example, a turboprop engine). In addition, the number of turbofan engines 5 is not limited to two, and may be three or more. In the description below, a direction where both end portions of the main wings 2 are connected, that is, a direction where the main wings 2 extend, will be called a wing width direction, and a direction where the fuselage 1 extends will be called the traveling direction.

Figure 2:
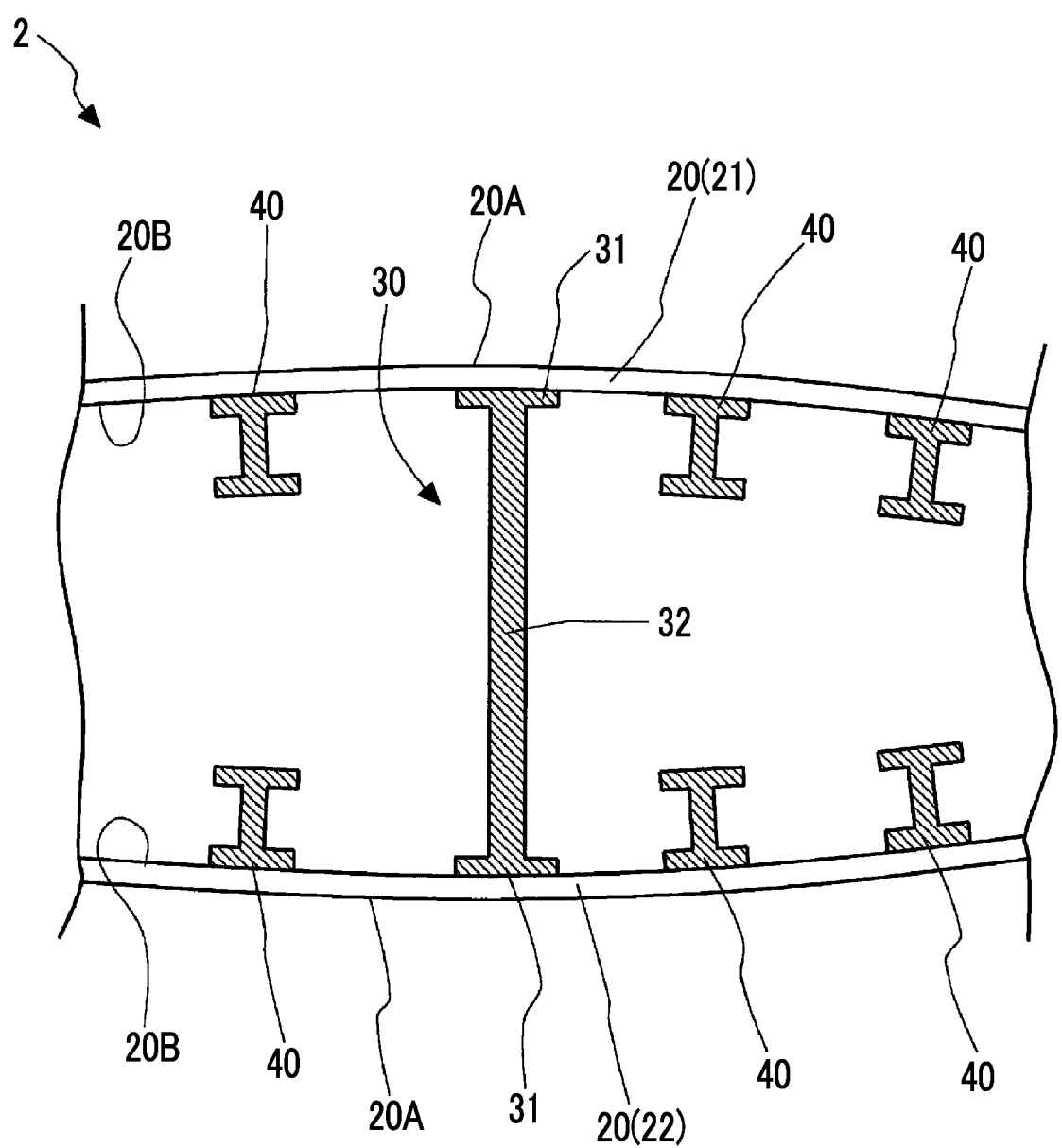
FIG. 2 is a sectional view of a wing body according to the first embodiment of the present invention.

FIG. 2 is a partial sectional view of the main wing 2 seen from the wing width direction.

Hereinafter, the main wing 2 will be described as an assembly.

As illustrated in FIG. 2, the main wings 2 each have a skin panel 20 (member to be reinforced), a spar 30, and stiffeners 40.

The skin panel 20 extends in the wing width direction. The skin panel 20 further extends in a direction orthogonal to the wing width direction as well. The skin panel 20 extends longer in the wing width direction than in the direction orthogonal to the wing width direction. For this reason, the skin panel 20 has a thin panel shape. One panel surface forms a wing surface 20A of the main wing 2 and the other panel surface forms an inner surface 20B of the main wing 2 (a surface of the member to be reinforced).

The skin panel 20 gently curves in accordance with an airfoil section of the main wing 2. In the following description, the skin panel 20 forming an upper side of the main wing 2 will be called an upper skin panel 21, and the skin panel 20 forming a lower side of the main wing 2 will be called a lower skin panel 22. The upper skin panel 21 and the lower skin panel 22 are integrally formed of fiber reinforced plastic (FRP).

The spar 30 is provided in order to reinforce the skin panel 20 and fix the skin panel 20 to the fuselage 1. That is, the spar 30 supports the weight of the skin panel 20 and a wing surface load during flight. Although not illustrated in detail, the spar 30 penetrates the fuselage 1 in the wing width direction to support the right and left main wings 2. As illustrated in FIG. 2, the spar 30 has an I-shaped sectional shape when seen from the wing width direction. Specifically, the spar 30 has a pair of spar flange portions 31 extending along the inner surface 20B of the skin panel 20 and a spar web portion 32 connecting the pair of spar flange portions 31 in an up-and-down direction. Each of the spar flange portions 31 is joined to the inner surface 20B of the skin panel 20. The spar flange portions 31 and the spar web portion 32 are integrally formed of fiber reinforced plastic.

(Reinforcing Member)

Hereinafter, the stiffeners 40 each including a stiffener body 41 will be described in detail as the reinforcing member including a reinforcing member body.

Figure 3:
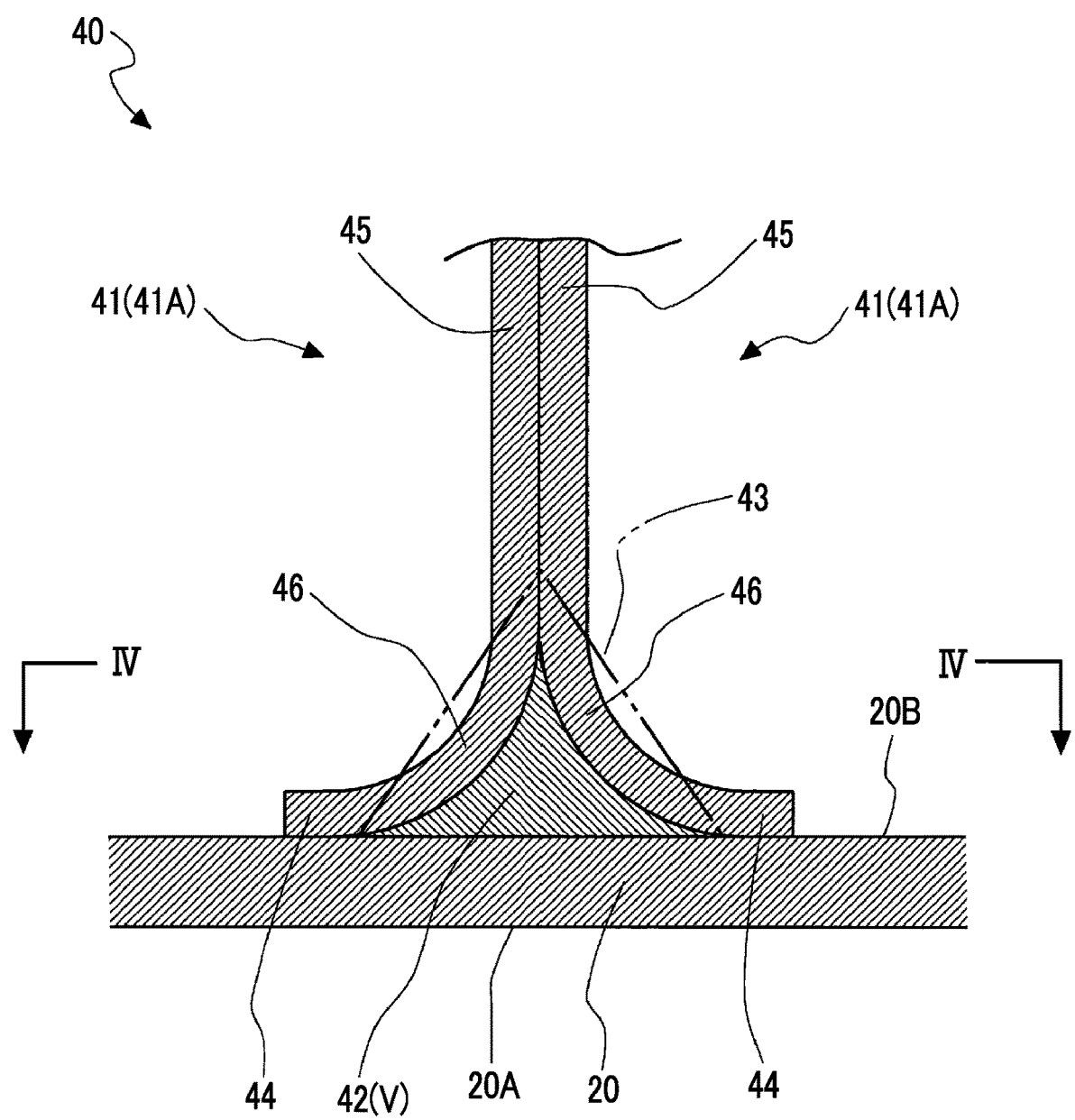
FIG. 3 is an enlarged sectional view of important parts of the wing body according to the first embodiment of the present invention.

The stiffeners 40 are provided to reinforce the skin panel 20 and to suppress distortion. The plurality of stiffeners 40 are arranged on the inner surface 20B of the skin panel 20 at intervals in the traveling direction. Each of the stiffeners 40 is a columnar member generally extending in the wing width direction. Each of the stiffeners 40 has an I-shaped sectional shape when seen from the wing width direction. Specifically, as illustrated in FIG. 3, the stiffeners 40 each have the stiffener body 41, a filler 42, and a crack regulating member 43.

The stiffener body 41 is formed by joining a pair of stiffener half bodies 41A formed in a substantially C-shape when seen from the wing width direction. Each of the stiffener half bodies 41A has a flange portion 44, a web portion 45 generally extending in the up-and-down direction, and a connecting portion 46 connecting the flange portion 44 and the web portion 45 to each other.

With this configuration, the stiffener body 41 includes the pair of flange portions 44.

Each of the flange portions 44 extends in the wing width direction along the inner surface 20B. In addition, each of the flange portions 44 extends along the inner surface 20B in a cross sectional view orthogonal to the wing width direction. Further, the pair of flange portions 44 is arranged at an interval on the inner surface 20B in a cross sectional view orthogonal to the wing width direction.

The flange portions 44 are joined to the inner surface 20B of the main wing 2.

The web portions 45 extend in a direction intersecting the inner surface 20B of the skin panel 20 (substantially up-and-down direction) in a cross sectional view orthogonal to the wing width direction. The connecting portions 46 connect the pair of flange portions 44 and the web portions 45 to each other in a cross sectional view orthogonal to the wing width direction. The connecting portions 46 curve in a direction separating from the inner surface 20B of the skin panel 20 from one side to the other side in the traveling direction. Specifically, the connecting portions 46 each have a generally arc shape when seen from the wing width direction. The stiffener body 41 is formed by joining the stiffener half bodies 41A formed in such a manner to each other, that is, the web portions 45 to each other in the traveling direction. At this time, a space is formed between the respective connecting portions 46 and the inner surface 20B of the skin panel 20. This space is called a filler space V into which the filler 42 is inserted. The filler space V has a substantially triangular shape. The filler 42 has a sectional shape corresponding to a sectional shape of the filler space V. Accordingly, the filler 42 closes the filler space V without a gap.

In the embodiment, the stiffener body 41 and the filler 42 each extend longer in the wing width direction than in the direction orthogonal to the wing width direction. The stiffener body 41 and the filler 42 are formed of fiber reinforced plastic. A fiber direction of the stiffener body 41 and a fiber direction of the filler 42 are different from each other. That is, a difference in a linear expansion coefficient between the stiffener body 41 and the filler 42 in a certain direction occurs.

In the embodiment, the stiffener body 41 and the skin panel 20 are fiber reinforced plastic in which fibers are directed in multiple directions. On the contrary, the filler 42 is fiber reinforced plastic in which fibers are directed in only one direction where the stiffener 40 extends (wing width direction).

For this reason, the fiber directions of the stiffener body 41 and the skin panel 20 are different from the fiber direction of the filler 42.

Figure 4:
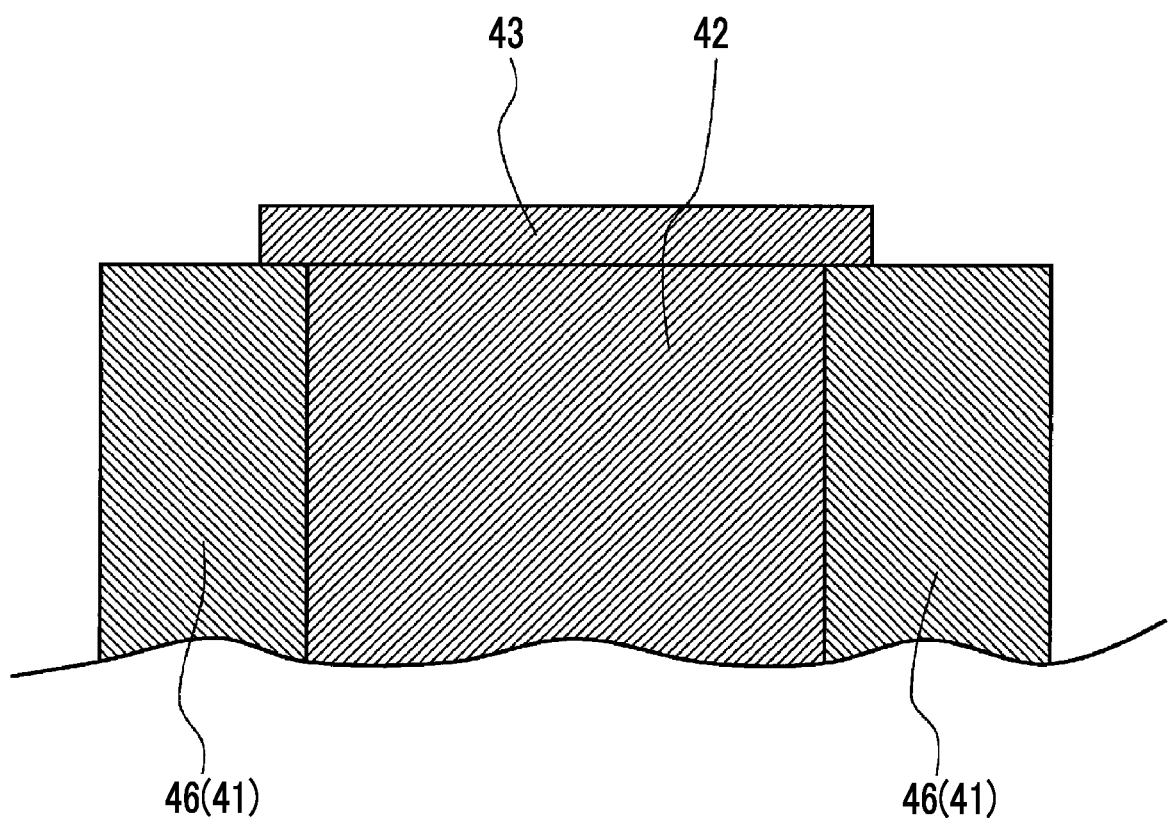
FIG. 4 is a plan view of the wing body according to the first embodiment of the present invention.

The crack regulating member 43 is a panel-shaped member attached to an end portion of the stiffener 40 in the wing width direction. The crack regulating member 43 is a member that restricts an end portion of the filler 42 in a direction intersecting the wing width direction, and suppresses thermal expansion at the end portion of the filler 42. Accordingly, the crack regulating member 43 suppresses the generation of a crack that develops from the end portion of the filler 42 to the inside of the filler 42. When seen from the wing width direction, the crack regulating member 43 has a triangular shape. FIG. 4 is a sectional view taken along line IV-IV of FIG. 3 In the examples of FIGS. 3 and 4, the crack regulating member 43 extends to straddle the respective end portions of the filler 42 and the stiffener body 41. However, it is sufficient for the crack regulating member 43 to have a size that can cover at least the filler 42. The crack regulating member 43 is formed of fiber reinforced plastic. Specifically, as the crack regulating member 43, a film-like prepreg material formed by infiltrating a resin into a fiber fabric or a unidirectional fiber material is suitably used.

Figure 5:
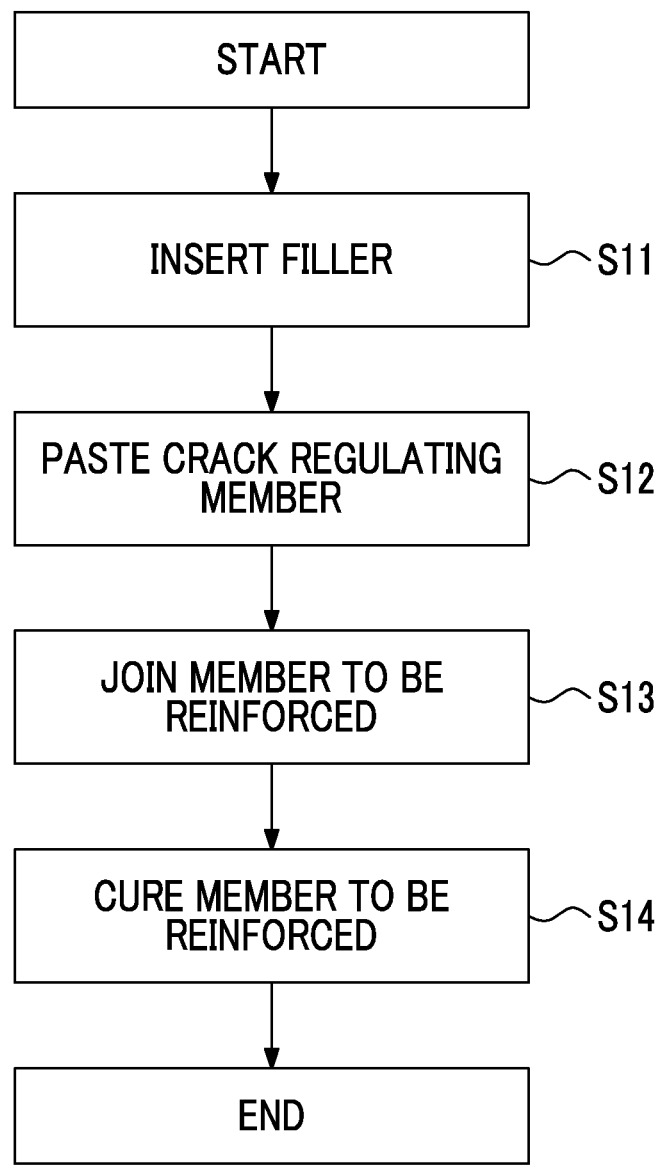
FIG. 5 is a flowchart showing steps of a method for producing a wing body according to the first embodiment of the present invention.

Next, a method for producing the main wing 2 (method for producing an assembly) according to the embodiment will be described with reference to FIG. 5. The method for producing the main wing 2 includes a step S11 of inserting the filler 42 into the filler space V (filler inserting step S11), a step S12 of pasting the crack regulating member 43 (crack regulating member pasting step S12), a step S13 of joining the stiffener 40 to the member to be reinforced (skin panel 20) (member to be reinforced joining step S13), and a step S14 of curing the member to be reinforced (skin panel 20) (member to be reinforced curing step S14).

In the filler inserting step S11, the filler 42 described above is inserted into an insertion space. Specifically, the filler 42 is inserted into the insertion space to fill in the insertion space. At this stage, the stiffener body 41 and the filler 42 are in a half-cured state. Subsequent to S11, in the crack regulating member pasting step S12, the crack regulating member 43 is pasted to the end portions of the filler 42 and the stiffener body 41. Subsequent to S12, in the member to be reinforced joining step S13, the flange portions 44 of the stiffener 40 are joined to the inner surface 20B of the skin panel 20. At this stage, at least the skin panel 20 is in a half-cured state. Subsequent to S13, in the member to be reinforced curing step S14, the skin panel 20 in a half-cured state is heated and cured. With this, all the steps of the method for producing the main wing 2 are completed.

In a case where the fiber direction of the stiffener body 41 and the fiber direction of the filler 42 are different from each other as described above, a difference in the linear expansion coefficients between the stiffener body and the filler in a certain direction occurs. That is, a difference in the amount of thermal expansion or the amount of shrinkage between the stiffener body 41 and the filler 42 occurs. Accordingly, when the skin panel 20 is cured, internal stress is generated between the stiffener body 41 and the filler 42, and a crack is generated particularly at the end portion of the filler 42 in some cases. In a case where the crack is generated, the yield of the producing process declines since the quality standards of the wing are not met.

Further, the filler 42 of the embodiment is formed using fiber reinforced plastic in which fibers are directed in the wing width direction. For this reason, the filler is likely to crack due to stress in the direction intersecting the wing width direction, compared with a member in which fibers are directed in multiple directions.

However, in the embodiment, the crack regulating member 43 that covers at least the end portion of the filler 42 is attached to the end portion of the stiffener 40. Accordingly, at least when the member to be reinforced is cured, a possibility that a crack is generated in the filler 42 can be reduced. In addition, even if a crack is generated in the filler 42, a possibility that the crack extremely develops can be reduced by the crack regulating member 43. Therefore, the quality of the main wing 2 improves, and thereby the yield of the producing process can be improved.

The first embodiment of the present invention has been described hereinbefore. Various changes and improvements can be added to the configurations and the method without departing from the gist of the present invention.

For example, in the embodiment, an example in which the crack regulating member pasting step S12 is executed before the member to be reinforced joining step S13 has been described.

Figure 6:
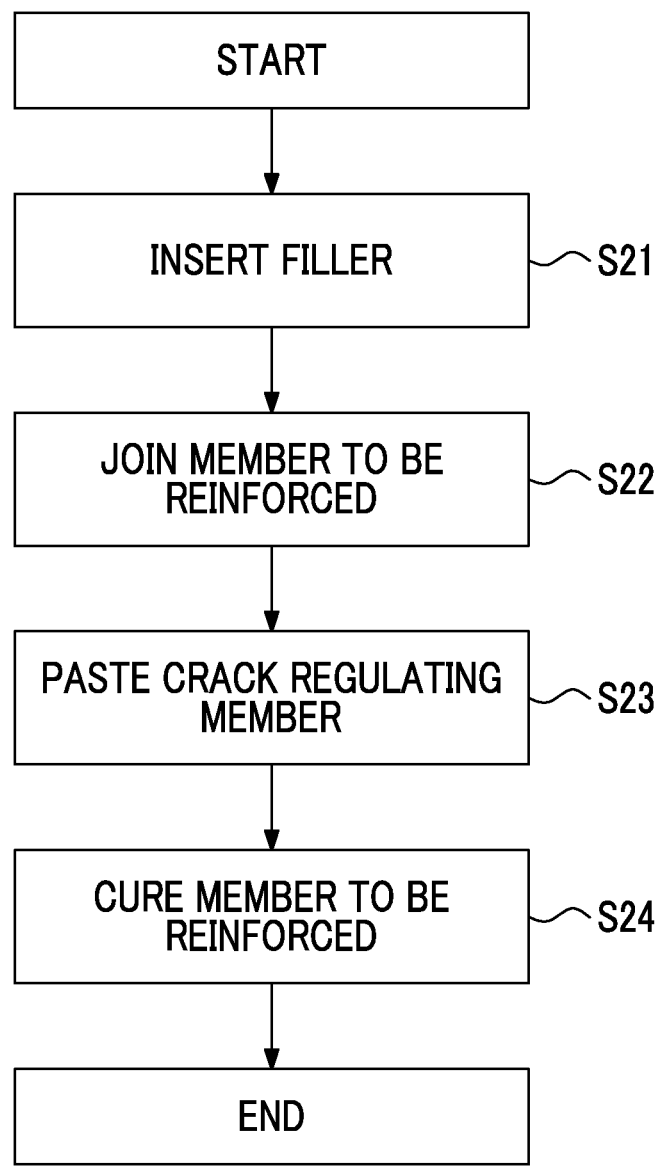
FIG. 6 is a flowchart showing a modification example of the method for producing a wing body according to the first embodiment of the present invention.

However, as shown in FIG. 6, in the method for producing the main wing 2 (method for producing an assembly) according to the embodiment, it is also possible to execute a crack regulating member pasting step S23 after a member to be reinforced joining step S22.

That is, in the method for producing the main wing 2 (method for producing an assembly) according to the embodiment, it is also possible to execute a step of inserting the filler 42 into the filler space V (S21), a step of joining the stiffener 40 to the member to be reinforced (skin panel 20) (S22), a step of pasting the crack regulating member 43 (S23), and a step of curing the member to be reinforced (skin panel 20) (S24) in this order.

Second Embodiment

Figure 7:
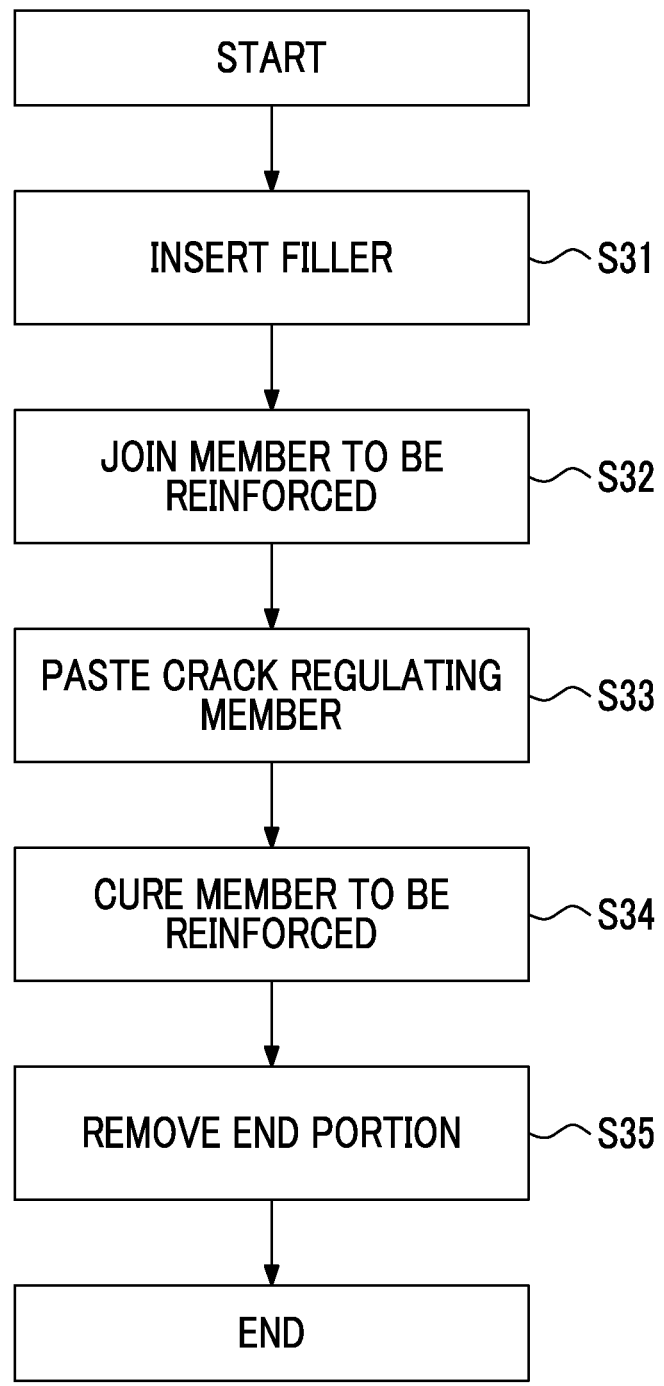
FIG. 7 is a flowchart showing steps of a method for producing a wing body according to a second embodiment of the present invention.
Figure 8:
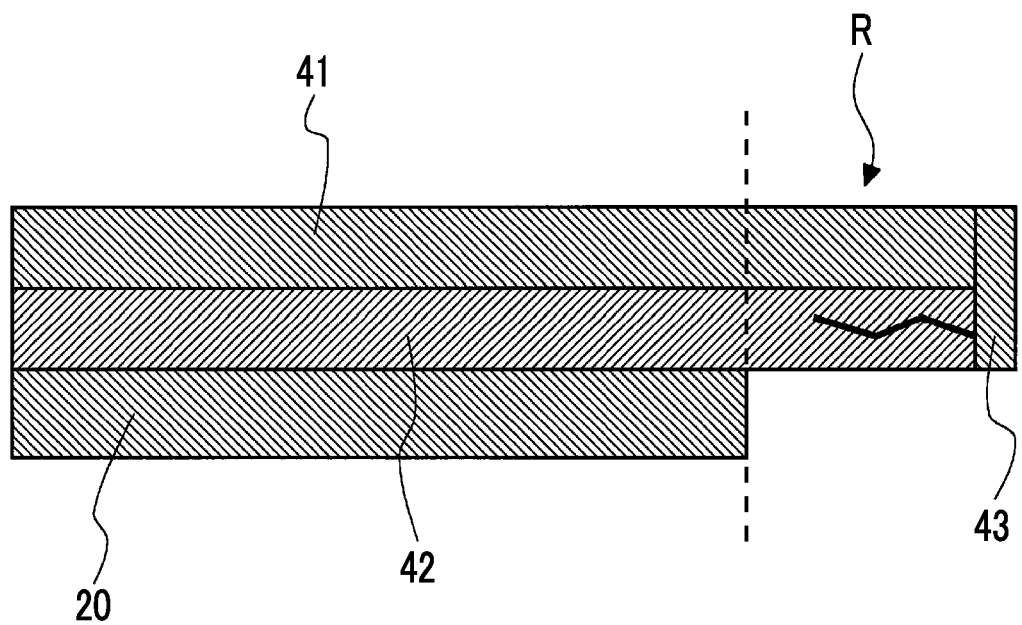
FIG. 8 is a sectional view illustrating a state where a step of curing a member to be reinforced is completed in the method for producing a wing body according to the second embodiment of the present invention.
Figure 9:
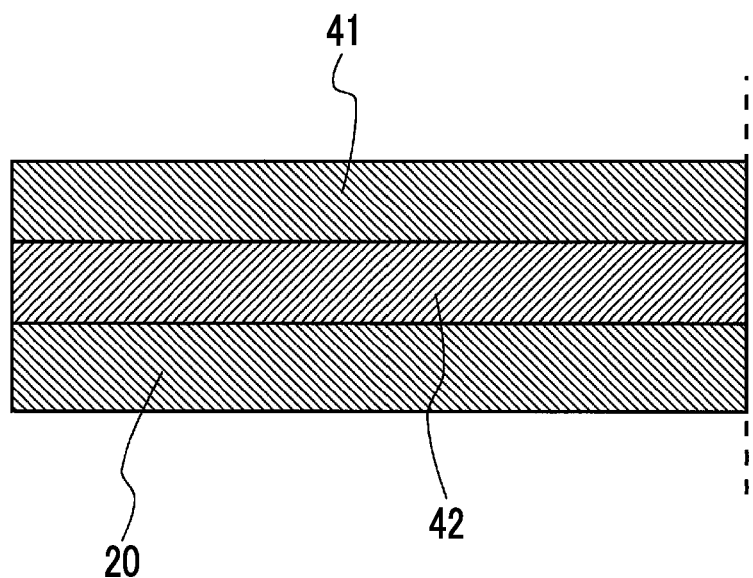
FIG. 9 is a sectional view illustrating a state where a step of removing an end portion is completed in the method for producing a wing body according to the second embodiment of the present invention.

Next, a second embodiment of the present invention will be described with reference to FIGS. 7 to 9. The same configurations as the first embodiment will be assigned with the same reference signs, and detailed description thereof will be omitted. As shown in FIG. 7, the method for producing the main wing 2 (method for producing an assembly) according to the embodiment includes a step S31 of inserting the filler 42 (filler inserting step S31), a step S32 of joining the member to be reinforced (member to be reinforced joining step S32), a step S33 of pasting the crack regulating member 43 (crack regulating member pasting step S33), a step S34 of curing the member to be reinforced (member to be reinforced curing step S34), and a step S35 of removing the end portions of the stiffener body 41 and the filler 42 (end portion removing step S35).

In the filler inserting step S31, the filler 42 described above is inserted into the insertion space. Specifically, the filler 42 is inserted into the insertion space to fill in the insertion space. At this stage, the stiffener body 41 and the filler 42 are in a half-cured state. Subsequent to S31, in the member to be reinforced joining step S32, the flange portions 44 of the stiffener 40 are joined to the inner surface 20B of the skin panel 20. At this stage, at least the skin panel 20 is in a half-cured state. Subsequent to S32, in the crack regulating member pasting step S33, the crack regulating member 43 is pasted to the end portions of the filler 42 and the stiffener body 41. Subsequent to S33, in the member to be reinforced curing step S34, the skin panel 20 in a half-cured state is heated and cured. In the end portion removing step S35, a portion including the end portions of the filler 42 and the stiffener body 41 is removed. With this, all the steps of the method for producing the main wing 2 are completed.

The end portion removing step S35 will be described in detail with reference to FIGS. 8 and 9. As illustrated in FIG. 8, in the embodiment, dimensions of the stiffener body 41 and the filler 42 in the wing width direction are set to be larger than design dimensions determined in advance. That is, a portion including the end portion of the stiffener 40 is a surplus portion R. When the member to be reinforced is cured in the member to be reinforced curing step S34, a crack is generated in the surplus portion R due to thermal expansion or shrinkage. As illustrated in FIG. 9, in the next end portion removing step S35, the surplus portion R including the crack is removed. To remove the surplus portion R, specifically, cutting is suitable.

As described hereinbefore, in the method for producing and the configuration according to the embodiment, the surplus portion R is set at the stiffener body 41 and the filler 42 under an assumption that a crack is generated in the end portion of the stiffener body 41 and the end portion of the filler 42. Therefore, even if a crack occurs, the crack can be kept within the area of the surplus portion R. By removing the surplus portion R including the crack, a conforming product without a crack can be easily obtained.

Third Embodiment

Figure 10:
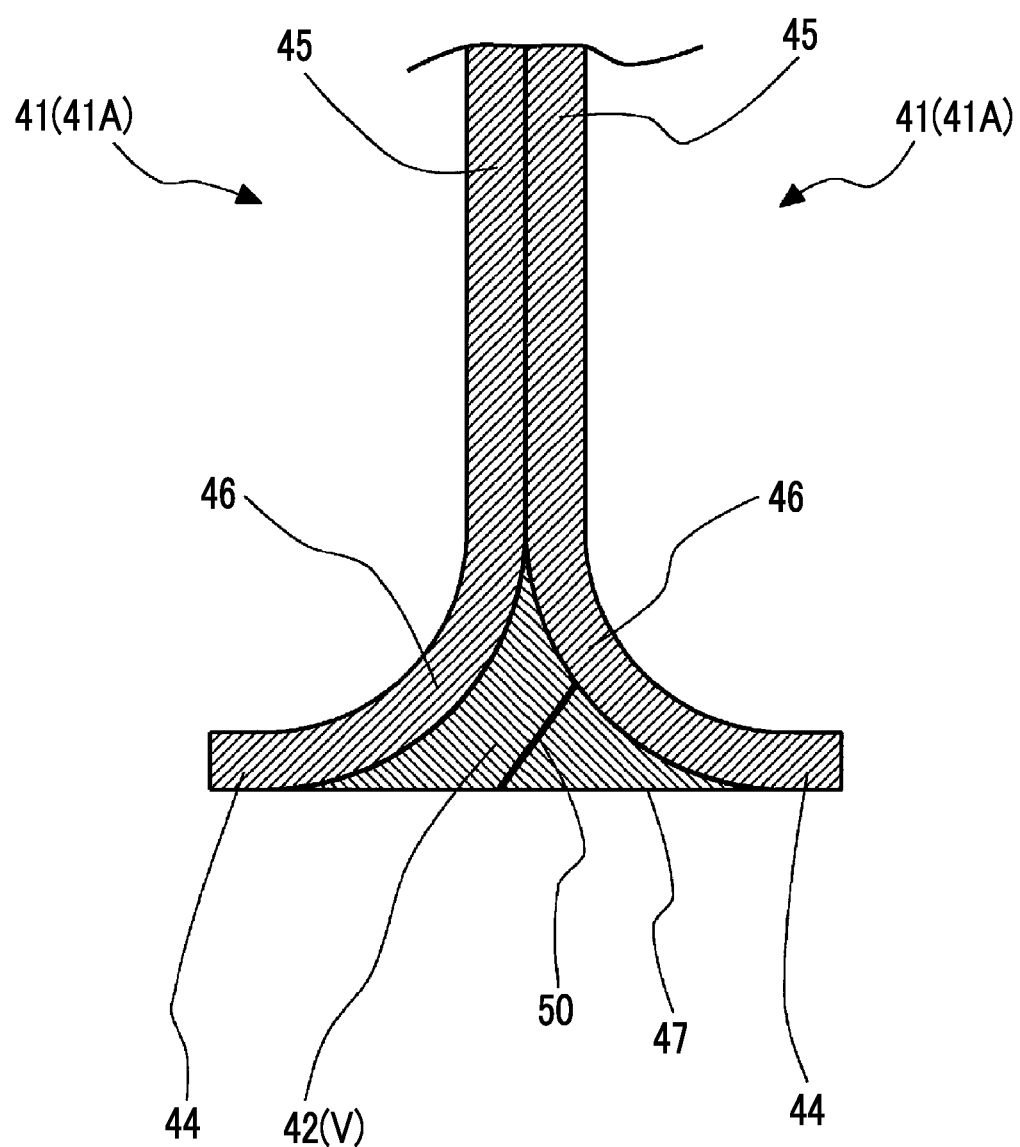
FIG. 10 is an enlarged sectional view of important parts of a filler according to a third embodiment of the present invention.

Next, a third embodiment of the present invention will be described with reference to FIG. 10. The same configurations as each of the embodiment will be assigned with the same reference signs, and detailed description thereof will be omitted. As illustrated in FIG. 10, in the embodiment, inside the filler 42, a film 50, which is a crack causing portion, is provided at least in a portion including the end portion of the filler 42 in the wing width direction. For example, the film 50 extends obliquely from a lower end surface of the filler 42 (filler bottom surface 47) in a direction facing one of the connecting portions 46 when seen from the wing width direction. As the film 50, a film-like member mainly made of a resin such as an elastomer, or a metal foil-like member is suitably used. It is desirable that the film 50 is buried in advance in the end portion of the filler 42 in the wing width direction when molding the filler 42.

Herein, a crack generated inside the filler 42 is determined as "OK" (permissible) or determined as "NG" (impermissible) depending on where the crack extends when seen from the wing width direction.

For example, since a crack extending in the up-and-down direction when seen from the wing width direction is unlikely to have an effect on the joining strength between the stiffener 40 and the skin panel 20, the crack is determined as "OK".

On the other hand, since a crack extending in a lateral direction when seen from the wing width direction has a great effect on the joining strength between the stiffener 40 and the skin panel 20, the crack is determined as "NG".

Further, a crack extending obliquely from the lower end surface of the filler 42 in a direction facing one of the connecting portions 46 when seen from the wing width direction is unlikely to have a great effect on the joining strength compared to the crack extending in the lateral direction, there is room for the crack to be determined as "OK".

Therefore, it can be said that not only the crack extending in the up-and-down direction but also the crack extending obliquely from the lower end surface of the filler 42 in a direction facing one of the connecting portions 46 extends in a permissible direction. Inside the filler 42, the film 50 described above extends along a crack extending in a permissible direction when seen from the wing width direction.

A crack extending in a permissible direction can be intentionally generated in the filler 42 by the crack causing portion. In other words, in a case where stress is applied to the filler 42, a possibility that an unintentional crack is generated can be reduced.

Further, in the configuration, a direction where a crack extends can be intentionally and precisely controlled by adjusting a direction where the film 50, which is the crack causing portion, extends.

In the embodiment, a configuration where an intentional crack is generated by the film 50, which is the crack causing portion, has been described as an example. However, a form of the crack causing portion is not limited to the film 50. As another example, it is also possible to form in advance a crack extending in a permissible direction in the end portion of the filler 42 by applying an external force to the filler 42 in which the film 50 is not provided. As still another example, it is also possible to form a notch, which is a starting point of a permissible crack, in the end portion of the filler 42.

Fourth Embodiment

Figure 11:
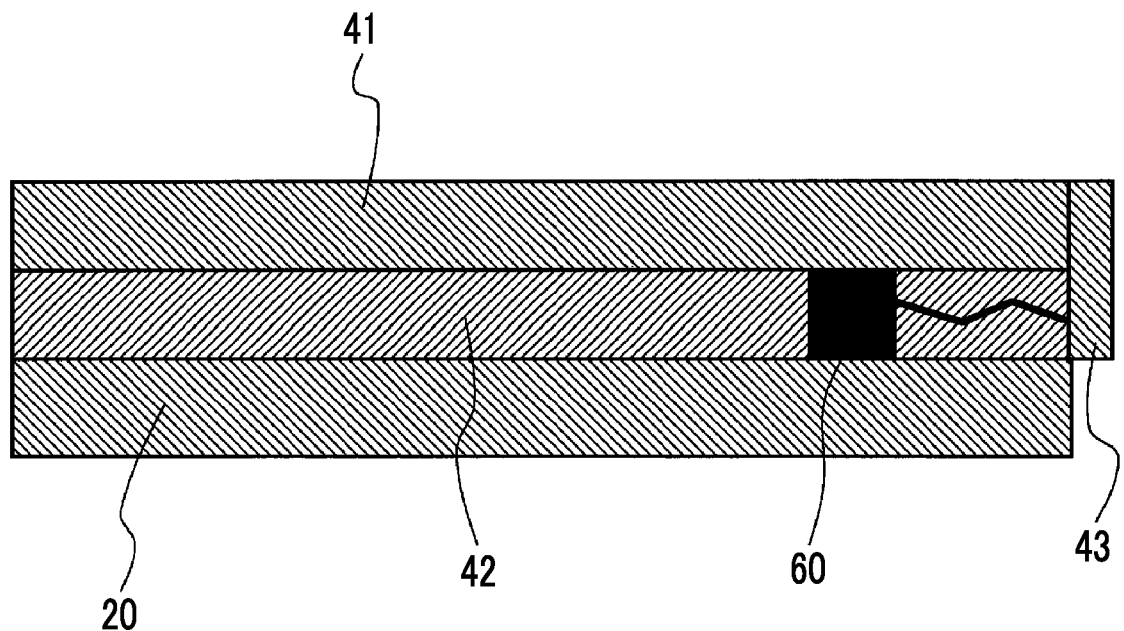
FIG. 11 is an enlarged sectional view of important parts of a wing body according to a fourth embodiment of the present invention.

Next, a fourth embodiment of the present invention will be described with reference to FIG. 11. The same configurations as each of the embodiment will be assigned with the same reference signs, and detailed description thereof will be omitted. As illustrated in FIG. 11, in the embodiment, a development prevention portion 60 that prevents the development of a crack is provided at a position separated from the end portion of the filler 42. The development prevention portion 60 is integrally molded of a resin material different from fiber reinforced plastic, and forms at least a part of the filler 42 in the wing width direction. Specifically, rubber and an elastomer are suitably used as the development prevention portion 60. The development prevention portion 60 may be integrally molded of a metallic material. It is desirable that the development prevention portion 60 is buried in advance inside the filler 42 when molding the filler 42. Further, the development prevention portion 60 may be a gap, or may be fiber reinforced plastic having a fiber orientation different from other portions.

In the configuration according to the embodiment, even in a case where a crack is generated from the end portion of the filler 42, the development of the crack can be prevented by the development prevention portion 60. In particular, since the development prevention portion 60 is different from a material forming the filler 42, the development of the crack can be more reliably prevented by the development prevention portion 60.

Fifth Embodiment

Figure 12:
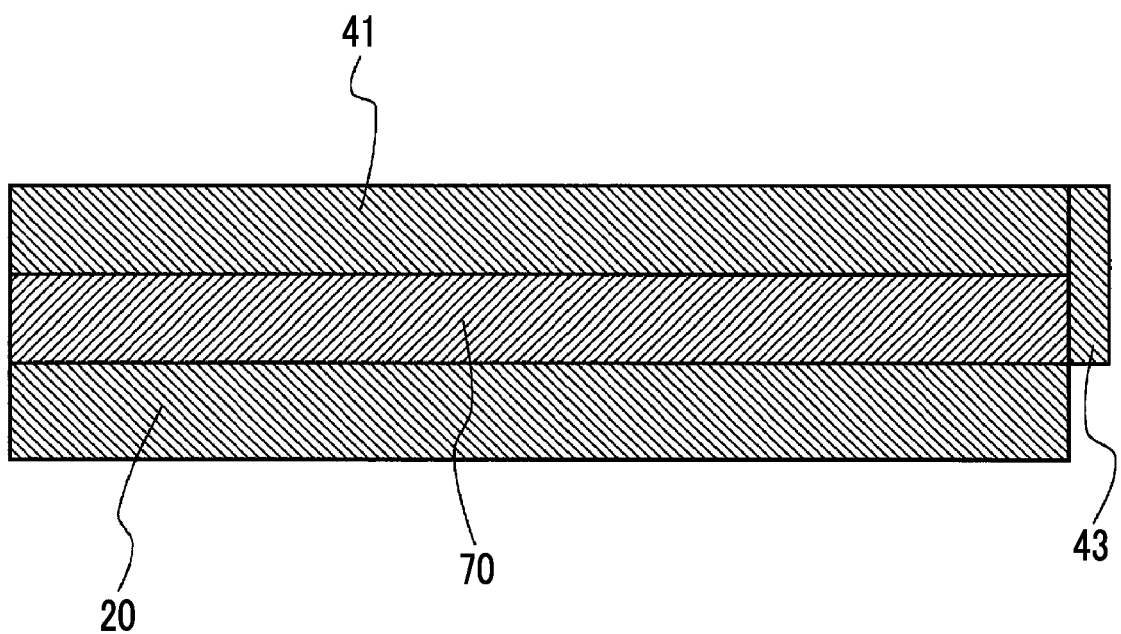
FIG. 12 is a sectional view of a wing body according to a fifth embodiment of the present invention.

Next, a fifth embodiment of the present invention will be described with reference to FIG. 12. The same configurations as each of the embodiment will be assigned with the same reference signs, and detailed description thereof will be omitted. In the embodiment, a fiber content of fiber reinforced plastic configuring a filler 70 is higher than a fiber content of fiber reinforced plastic configuring the stiffener body 41 and the skin panel 20. For example, fiber reinforced plastic configuring the filler 70 contains 50% more fibers than fiber reinforced plastic configuring the stiffener body 41 and the skin panel 20. In addition, in order to reduce costs, it is desirable that the fibers of fiber reinforced plastic configuring the filler 70 are directed in only one direction.

In the configuration according to the embodiment, since the fiber content of the filler 70 is higher than the fiber content of the stiffener body 41, the strength of the filler 70 improves. Specifically, the proportion of the fibers inside the filler 70 is high, and the proportion of the resin infiltrated between the fibers is low. Herein, a crack generated in fiber reinforced plastic is mainly generated and develops along a resin portion. In the configuration, since the proportion of the resin is low, a possibility that a crack is generated can be reduced.

The fifth embodiment of the present invention has been described hereinbefore. Various changes and improvements can be added to the configurations and the method without departing from the gist of the present invention.

MODIFICATION EXAMPLE

Although the main wing 2 having the stiffeners 40 is an assembly in each of the embodiments, an object to which the stiffeners 40 are applied is not limited to the main wing 2. As a modification example, an object assembled by combining wing bodies, including the horizontal stabilizers 3 and the vertical stabilizer 4 which are described above, with the stiffeners may be an assembly, or an object assembled by combining another member to be reinforced with the stiffeners may be an assembly.

Although each of the stiffeners 40 of each of the embodiments has an I-shaped sectional shape when seen from the wing width direction, the stiffeners may have any sectional shape. As the modification example, each of the stiffeners 40 may have a T-shaped sectional shape or may have a J-shaped sectional shape when seen from the wing width direction.

In each of the embodiments, each of the stiffeners 40 is a columnar member extending in the wing width direction. As the modification example, each of the stiffeners 40 may be a columnar member extending in any direction insofar as each stiffener extends along the surface of the member to be reinforced.

In each of the embodiments, each of the stiffeners 40 is joined to the inner surface 20B. As the modification example, just as the spar 30 joined to each inner surface 20B of the upper skin panel 21 and the lower skin panel 22, each of the stiffeners 40 may be respectively joined to a pair of facing inner surfaces 20B.

Although a case where the reinforcing member is the stiffener 40 has been described in each of the embodiments, any reinforcing member may be used insofar as the reinforcing member is a reinforcing member attached to the surface of the member to be reinforced. As the modification example, the reinforcing member including the filler and the reinforcing member body may be a spar including the filler and a spar body.

Although the filler 42 is directly joined to the inner surface 20B of the skin panel 20 in each of the embodiments, the filler 42 may be joined to the inner surface 20B of the skin panel 20 via another member.

Figure 13:
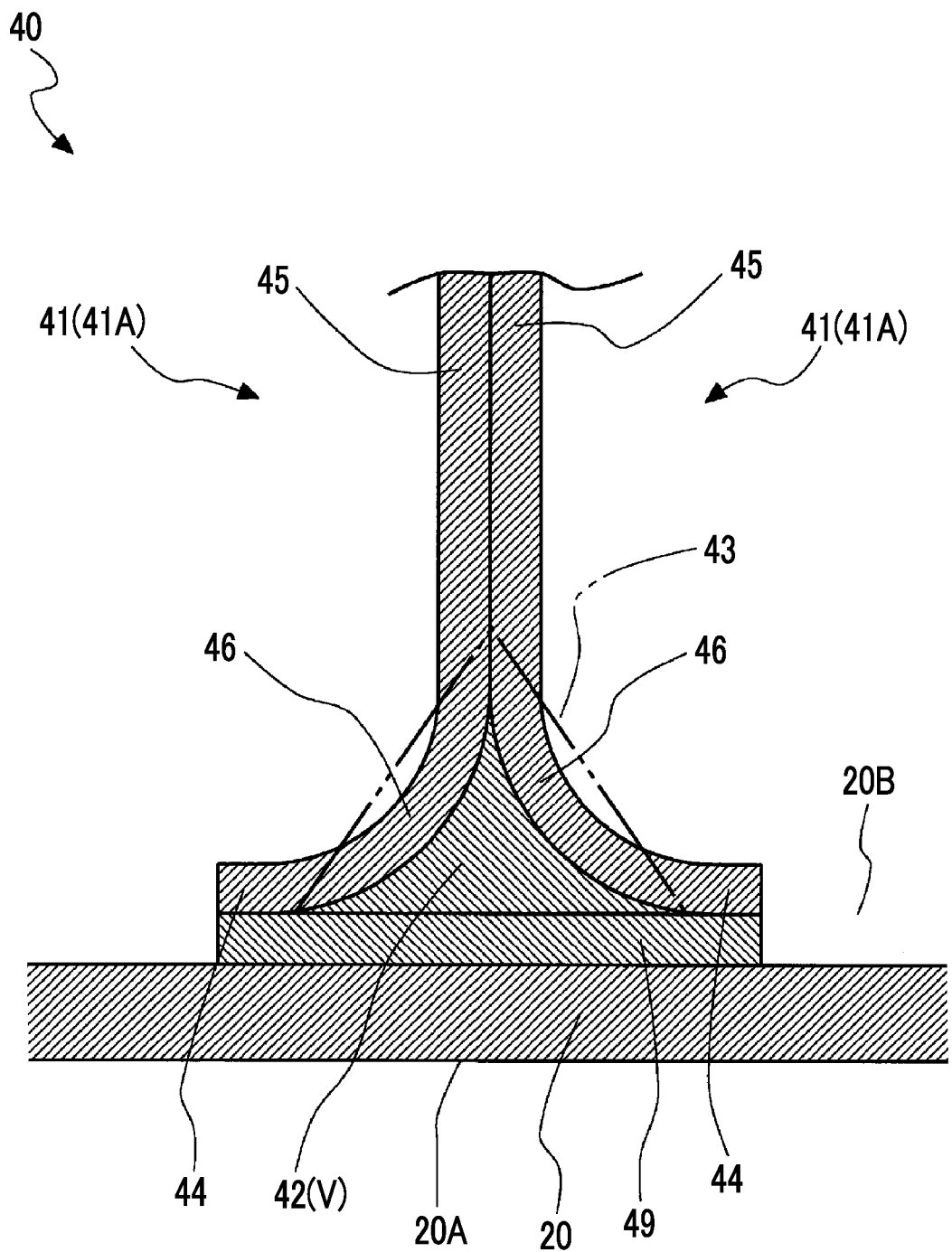
FIG. 13 is an enlarged sectional view of important parts of a wing body according to a modification example of each embodiment of the present invention.

As the modification example, as illustrated in FIG. 13, the stiffener 40 may have a substrate-like covering member 49, which is a part of the stiffener 40, on a lower surface of the filler 42 and lower surfaces of the flange portions 44. Herein, the covering member 49 covers the lower surface of the filler 42 and the lower surfaces of the flange portions 44. Further, the filler 42 and the flange portions 44 are joined to the inner surface 20B of the skin panel 20 via the covering member 49. At this time, each filler 42 is inserted into each space formed between each connecting portion 46 and the covering member 49 which is the filler space V formed between the respective connecting portions 46 and the inner surface 20B of the skin panel 20.

Although the filler 42 is inserted in the space (filler space V) formed by joining the pair of stiffener half bodies 41A in each of the embodiments, the filler may be inserted into any space insofar as the space is a space formed between the stiffener body (reinforcing member) and the inner surface of the skin panel (surface of the member to be reinforced). For example, configurations as in a first modification example and a second modification example below may be adopted.

Figure 14:
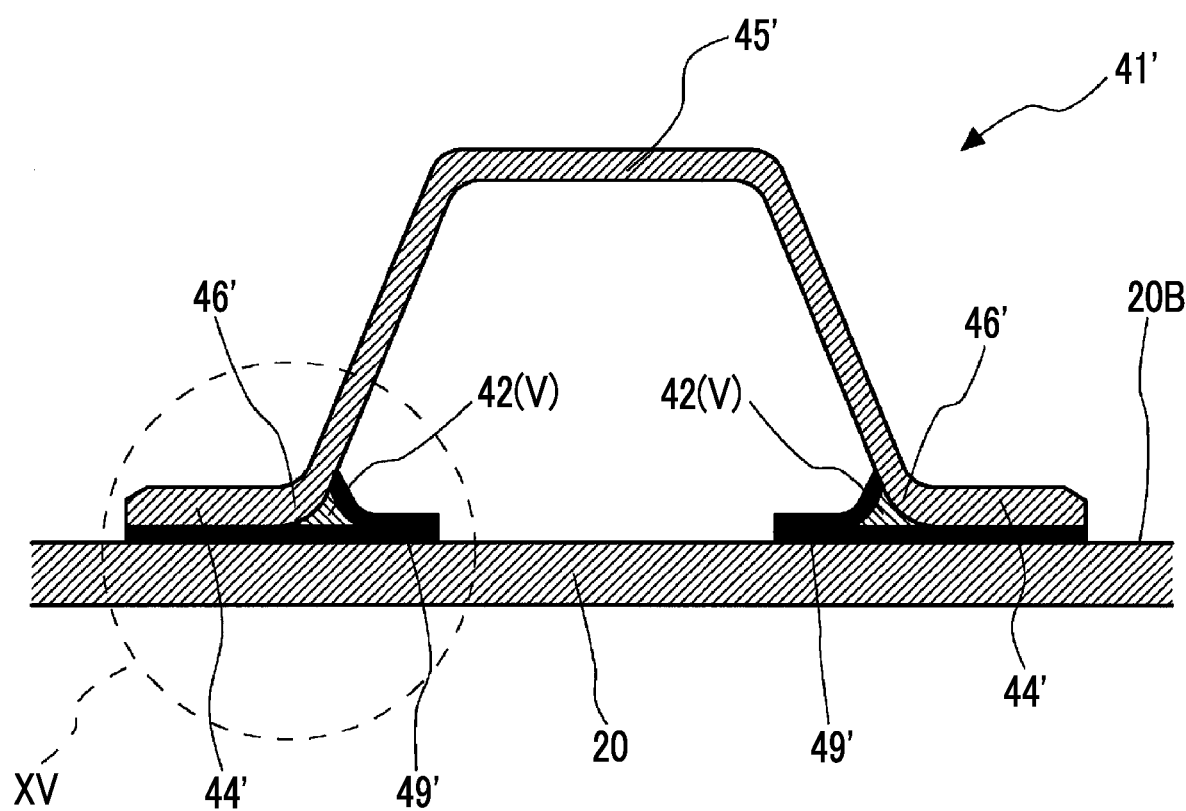
FIG. 14 is an enlarged sectional view of important parts of a wing body according to a first modification example of each embodiment of the present invention.
Figure 15:
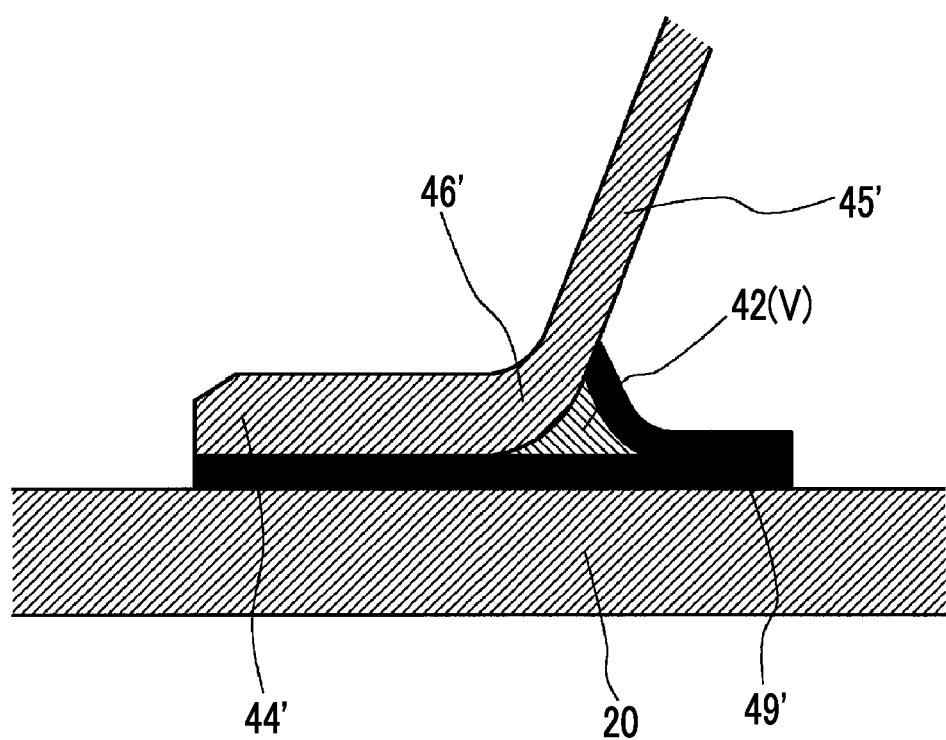
FIG. 15 is an enlarged view of a portion XV of FIG. 14.

As the first modification example, the filler 42 may be inserted into the filler space V formed between a stiffener body 41' and the inner surface 20B of the skin panel 20 as illustrated in FIGS. 14 and 15.

Herein, the stiffener body 41' includes a web portion 45', a pair of flange portions 44', and a connecting portion 46' that connects the web portion 45' and each flange portion 44' to each other.

The web portion 45' extends in a direction along the inner surface 20B and in a direction intersecting the inner surface 20B such that a rectangular space is formed between the inner surface 20B of the skin panel 20 and the web portion in a cross sectional view orthogonal to the wing width direction.

The filler 42 is inserted into each space formed between each of the connecting portions 46' and the inner surface 20B of the skin panel 20 as the filler space V formed between the stiffener body 41' and the inner surface 20B of the skin panel 20. At this time, as illustrated in FIGS. 14 and 15, a covering member 49' may cover exposed surfaces of the filler 42 (a lower surface and a surface opposing to each of the connecting portions 46', out of surfaces of the filler 42) and lower surfaces of the flange portions 44' in a cross sectional view orthogonal to the wing width direction.

Figure 16:
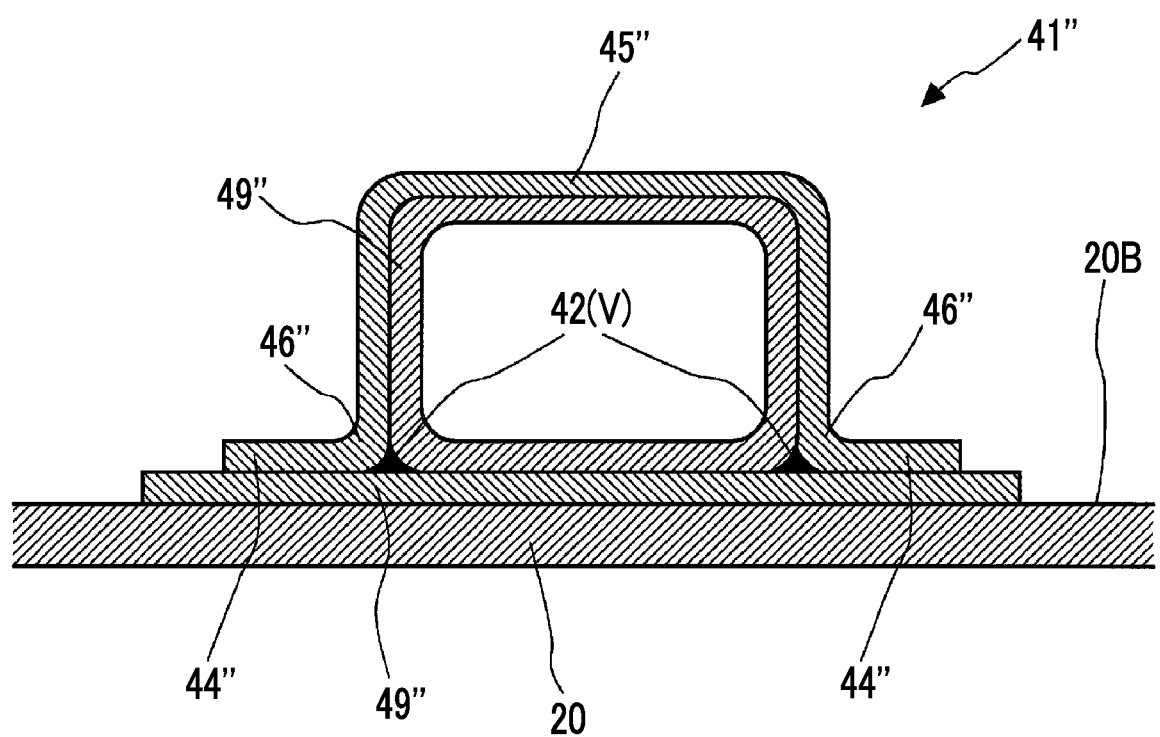
FIG. 16 is an enlarged sectional view of important parts of a wing body according to a second modification example of each embodiment of the present invention.

As the second modification example, the filler 42 may be inserted into the filler space V formed between a stiffener body 41" and the inner surface 20B of the skin panel 20 as illustrated in FIG. 16.

Herein, the stiffener body 41" includes a web portion 45", a pair of flange portions 44", and a connecting portion 46" that connects the web portion 45" and each flange portion 44" to each other.

The web portion 45" extends in a direction along the inner surface 20B and in a direction intersecting the inner surface 20B such that a rectangular space is formed between the inner surface 20B of the skin panel 20 and the web portion in a cross sectional view orthogonal to the wing width direction.

The filler 42 is inserted into a space formed between each of the connecting portions 46" and the inner surface 20B of the skin panel 20 as the filler space V formed between the stiffener body 41" and the inner surface 20B of the skin panel 20. At this time, as illustrated in FIG. 16, a covering member 49", which is a part of the stiffener, may cover an inner peripheral surface of a rectangular space formed between the web portion 45" and the inner surface 20B of the skin panel 20, and the lower surface of the filler 42, the lower surfaces of the flange portions 44" in a cross sectional view orthogonal to the wing width direction.

In each of the embodiments, the crack regulating member 43 is formed of fiber reinforced plastic. As the modification example, the crack regulating member 43 may be formed of any material other than fiber reinforced plastic, such as a resin, cloth, and a metal, insofar as the end portion of the filler 42 can be restricted.

Although some embodiments of the present invention have been described hereinbefore, the embodiments have been presented as examples only, and are not intended to limit the scope of the invention. It is possible to execute the embodiments in a variety of other forms, and various types of omission, replacement, and change can be performed without departing from the gist of the invention. The embodiments and modifications thereof are included in the scope and gist of the invention, and are also included in the scope of the invention and equivalents thereof which are described in the claims.

INDUSTRIAL APPLICABILITY

In the present invention, the yield of the assembly can be improved.

REFERENCE SIGNS LIST 1 fuselage
2 main wing (assembly)
3 horizontal stabilizer
4 vertical stabilizer
5 turbofan engine
20 skin panel (member to be reinforced)
20A wing surface
20B inner surface (surface)
21 upper skin panel
22 lower skin panel
30 spar
31 spar flange portion
32 spar web portion
40 stiffener (reinforcing member)
41 stiffener body (reinforcing member body)
41' stiffener body (reinforcing member body)
41" stiffener body (reinforcing member body)
41A stiffener half body
42 filler
43 crack regulating member
44 flange portion
44' flange portion
44" flange portion
45 web portion
45' web portion
45" web portion
46 connecting portion
46' connecting portion
46" connecting portion
47 filler bottom surface
49 covering member
49' covering member
49" covering member
50 film
60 development prevention portion
70 filler
100 aircraft
R surplus portion
V filler space

The invention claimed is:

1. A reinforcing member comprising:
a reinforcing member body that is attached to a surface of a member to be reinforced extending at least in one direction and extends in the one direction; and
a filler that is provided between the reinforcing member body and the surface and extends in the one direction,
wherein in a cross sectional view orthogonal to the one direction, the reinforcing member body has
a pair of flange portions that extends along the surface and is arranged at an interval on the surface,
a web portion that extends in a direction intersecting the surface, and
a connecting portion that connects the pair of flange portions and the web portion to each other and forms a filler space allowing the filler to be inserted therein between the surface and the connecting portion,
wherein the reinforcing member further comprises a crack regulating member that covers at least a filler end face in the one direction such that the crack regulating member extends to straddle an end face of the reinforcing member body in the one direction, and
wherein the crack regulating member has a panel shape having a panel face which faces the filler end face.

2. An assembly comprising:
the member to be reinforced; and
the reinforcing member according to claim 1 that is attached to the surface of the member to be reinforced.

3. The reinforcing member according to claim 1,
wherein the filler has a filler bottom face facing the surface of the member to be reinforced, and
wherein a crack extending in a direction intersecting the filler bottom surface is formed in advance in a portion including at least the filler end face.

4. The reinforcing member according to claim 1,
wherein the filler has a filler bottom face facing the surface of the member to be reinforced, and
wherein the reinforcing member comprises a crack causing portion that generates a crack extending in a direction intersecting the filler bottom face in a portion including at least the filler end face.

5. The reinforcing member according to claim 4,
wherein the crack causing portion is a film that extends along the crack.

6. The reinforcing member according to claim 1,
wherein the reinforcing member comprises a development prevention portion that is provided at a position separated from the filler end face and prevents development of a crack in the filler.

7. The reinforcing member according to claim 6,
wherein the development prevention portion is formed of a resin material, and
wherein the filler is formed of a material different from the resin material.

8. The reinforcing member according to claim 6,
wherein the development prevention portion is formed of a metallic material, and
wherein the filler is formed of a material different from the metallic material.

* * * * *